Patented Feb. 4, 1936

2,029,410

UNITED STATES PATENT OFFICE 2,029,410

CHEMICAL PRODUCTS AND PROCESSES FOR PRODUCING SAME

Wallace H. Carothers, Fairville, Pa., and Arnold M. Collins and James E. Kirby, Wilmington, Del., assignors to E. I. du Pont de Nemours & Company, Wilmington, Del., a corporation of Delaware No Drawing. Application April 11, 1933, Serial No. 665,554

25 Claims. (Cl. 260—2)

This invention relates to the process of polymerizing chloro-2-butadiene-1,3 and it pertains in particular to the polymerization of this compound in the presence of materials such as gums, resins, polymers, and polymerizable materials, which improve the characteristics of the final polymer.

This application is a continuation in part of the applicants' copending application Serial No. 519,242, filed February 28, 1931.

It is an object of the invention to produce new polymers of chloro-2-butadiene-1,3. It is a further object of the invention to produce new polymers of a rubber-like or resin-like character by incorporating into the chloro-2-butadiene-1,3 prior to polymerization, resins, gums, polymers or polymerizable materials which modify the properties of the final polymer. A further object relates to processes for preparing these products. Other objects of the invention will appear hereinafter.

The process of the present invention comprises a method of preparing compositions containing polymers of chloro-2-butadiene-1,3 in chemical combination, in solution, in aqueous dispersion or otherwise associated with a great variety of gums, resins, and polymeric materials. It is desired to state that, in all cases, one of the starting materials is monomeric chloro-2-butadiene-1,3, and that the polymers of this material are formed in the presence of the added polymerizable compounds, polymeric material, gums, natural and synthetic resins, and components of synthetic resins, products being thereby obtained which have very desirable properties for certain uses.

In order to illustrate the invention we have set forth below a number of examples. These examples have been classified in accordance with the properties of the products obtained. By a suitable choice of conditions of polymerization and type and amount of interpolymerizing or added ingredients or ingredients we have been able to obtain products containing polymerized chloro-2-butadiene-1,3 and having most diverse properties. It is not possible to draw any exact generalizations concerning the properties of these products but it may be said that when polymerized chloro-2-butadiene-1,3 preponderates (50% or more) the products are usually rubber-like but if the added ingredients are present in large amount the product will resemble those ingredients (or their polymers) except that it has a toughness and elasticity similar to that of polymerized chloro-2-butadiene-1,3. The products will be seen to range from strong, plastic masses to elastic, extensible, rubber-like materials, tough, resinous masses and hard, brittle resins. Some of them have properties which make them very useful for rubber substitutes for the preparation of molded, dipped, coated, and extruded articles while others are valuable impregnating and film-forming materials.

A. Modified polymers of chloro-2-butadiene-1,3 having rubber-like properties The partial polymerization of chloro-2-butadiene-1,3 to yield a plastic, polymerizable polymer may be carried out in the presence of a number of other polymerizable materials under a variety of conditions. In some of these experiments it was possible to show by means of chlorine analyses that the added substance actually polymerized and exerted an influence on the properties of the product.

Example I

One hundred thirty-five grams of chloro-2-butadiene-1,3 and 15 g. of as-dichloroethylene were placed in a bottle of ordinary soft glass and exposed to the light from a Cooper-Hewitt lamp for 45 hours at about 27° C. After this length of time the solution was very viscous and about 25% of the material had polymerized. It was poured into alcohol and the precipitated plastic mass thoroughly washed with alcohol and dried by milling on cold rolls. A chlorine analysis (found, Cl=44.93%) indicated that the product contained about 15% of polymerized as-dichloroethylene. The plastic mass was compounded according to the following formula and cured in a mold at 125° C. for 25 minutes.

| | Parts |
|---|---|
| Polymer | 100 |
| Phenyl-$\beta$-naphthylamine | 1.5 |
| Zinc oxide | 10.0 |
| Benzidine | 1.0 |
| Stearic acid | 1.0 |

The cured product was strong and elastic and closely resembled soft, vulcanized rubber. It remained pliable for more than 5 weeks at 10° C. whereas a polymer prepared similarly but without the as-dichloroethylene stiffened in 24–48 hours at 10° C.

Example II

A solution of 20 g. of dimethyl-2,3-butadiene-1,3 in 80 g. of chloro-2-butadiene-1,3 was polymerized under the same conditions as in Example I. After 72 hours the viscous sirup was precipitated with alcohol and the polymer washed and cured as in Example I. The cured polymer remained pliable for more than five weeks at 10° C.

Example III

A solution of 20 g. of acrylonitrile in 80 g. of chloro-2-butadiene-1,3 was polymerized to a viscous sirup under the conditions of Examples I and II except that only 18 hours were required to reach the desired polymer content. The polymer was precipitated and cured in exactly the same manner. The cured product had good pliability.

These polymers are characterized by excellent softness and pliability and are therefore eminently suited to certain uses. For example, they may be calendered on to cloth for the preparation of coated fabrics of excellent quality since they retain the properties of long life and resistance to various solvents and reagents which are characteristic of polymers of pure chloro-2-butadiene-1,3. Solutions of the uncured polymers in benzene, toluene or other suitable solvents may be used for coating and impregnating by any of the numerous processes set forth in the copending application of Collins and Larson, Serial No. 572,727, filed November 2, 1931. Further, the polymers may be compounded with reenforcing agents, such as carbon black, to produce further useful products.

We have also used monovinylacetylene, divinylacetylene, styrene, methyl acrylate, methyl methacrylate and acrolein in the process of the above examples but the results were not quite satisfactory. Nevertheless, all of them gave some improvement in pliability.

In the following examples the use of polymerizable modifying agents in the preparation of synthetic latices from chloro-2-butadiene-1,3 is illustrated.

Example IV

A solution of 20 g. of as-dichloroethylene in 80 g. of chloro-2-butadiene-1,3 was emulsified in 100 g. of 2% sodium oleate solution with the aid of a high speed stirrer. The emulsion was stored at a temperature of 25° C. for 26 hours after which time 82% of the chlorinated hydrocarbons had polymerized. Phenyl-$\beta$-naphthylamine (1.5% on the polymer content) was then added in the form of an aqueous dispersion to act as an antioxidant for the polymers. A film was flowed on a porous plate. After most of the water had soaked into the plate there remained a film of rubber-like polymer. The drying was completed by heating the film at 80° C. for 48 hours. The finished product was a film resembling soft vulcanized rubber. It had a tensile strength of 1000 lbs./in.$^2$ and broke at an elongation of 1000%. It remained pliable during a storage at 10° C. for two months whereas unmodified chloro-2-butadiene-1,3, similarly polymerized, became stiff overnight at 10° C.

Example V

A solution of 10 g. of dimethyl-2,3-butadiene-1,3 in 90 g. of chloro-2-butadiene-1,3 was emulsified in 100 g. of 2% soduim oleate solution. The emulsion was stored at 25° C. for 45 hours. The resulting polymerized emulsion was treated as in the preceding example and a film similarly cast and dried. This film had a tensile strength of 1100 lbs./in.$^2$ and an elongation of 1300%. It remained pliable during prolonged storage at 10° C.

It will be observed that in the two preceding examples the chlorobutadiene polymerized completely to an elastic polymer and rubber articles prepared from these synthetic latices, like those from chlorobutadiene alone, required no vulcanization and the modified rubber retained the desirable properties previously set forth. These latices are admirably suited to the preparation of coated and impregnated cloth and paper because of the softness and pliability of the synthetic rubber.

It should be pointed out that the improved resistance to stiffening at low temperatures is quite unexpected in view of the properties of the polymers of the materials caused to interpolymerize with chlorobutadiene in Examples I–V. Polymerized as-dichloroethylene is an amorphous, insoluble powder. Polymerized dimethylbutadiene is rubber-like but it has been found that the incorporation of much more than 20% of natural rubber into polymerized chlorobutadiene is necessary in order to obtain a product which will not stiffen. Although we do not wish to be limited to theory, we attribute the improvement in pliability in the processes of the above examples to an actual chemical intercombination of chlorobutadiene with the added substance, resulting in a chemically and physically different molecule.

The softening of chlorobutadiene rubber by interpolymerization with a polymerizable compound, dichlorobutadiene, whose individual polymers are hard, amorphous and insoluble has already been disclosed in the copending application of Carothers and Berchet, Serial No. 589,052, filed January 26, 1932.

The following experiments illustrate the polymerization of chlorobutadiene in aqueous emulsion with a number of other polymerizable compounds. Most of these were substances which polymerize much more slowly than does chlorobutadiene and consequently the degree of copolymerization or interpolymerization which occurred was less than in the preceding examples.

Example VI

A solution of 10 g. of styrene in 40 g. of chloro-2-butadiene-1,3 was emulsified in 50 g. of 2% sodium oleate solution. The emulsion was stored at 0°–10° C. for 48 hours. It was then stabilized by the addition of phenylnaphthylamine as in Example IV and a film cast on a porous plate. After drying at 80° C. for 48 hours a fairly strong and elastic film resembling soft vulcanized rubber was obtained. This film remained pliable at room temperature for several weeks, much longer than a control film containing no styrene, but it eventually gradually stiffened, perhaps due to the evaporation of unpolymerized styrene, which boils at 146° C.

Example VII

A solution of 25 g. of chloro-2-butadiene-1,3, 25 g. of styrene and 0.125 g. of benzoyl peroxide was emulsified in 50 g. of 2% sodium oleate solution. The emulsion was allowed to polymerize for 48 hours at 0°–10° C. and then stabilized and a film prepared as in the preceding example. While this film remained soft and pliable for more than two months at room temperature, it eventually stiffened.

Example VIII

A solution of 1 g. of heptyl-2-butadiene-1,3 ($CH_2=C(C_7H_{15})-CH=CH_2$) in 9 g. of chloro-2-butadiene-1,3 was emulsified in 10 g. of 2% sodium oleate solution. The emulsion was polymerized, stabilized and a film prepared as in Example IV. This product was fairly strong and elastic and resembled soft vulcanized rubber. It had better tear resistance than films from emulsions of chlorobutadiene alone and better, though not permanent, pliability.

Example IX

A solution of 10 g. of ethyl fumarate in 40 g. of chloro-2-butadiene-1,3 was emulsified in 50 g. of 2% sodium oleate solution and the emulsion allowed to polymerize for 48 hours at 0°–10° C. The emulsion was stabilized and a film prepared as in the preceding examples. This film, which resembled those previously described, had good strength and elasticity and remained pliable longer than films from emulsions of chlorobutadiene alone. It also had better tear resistance.

Example X

A solution of 1 g. of bromo-2-butadiene-1,3 in 99 g. of chloro-2-butadiene-1,3 was emulsified in 100 g. of 2% sodium oleate solution and the emulsion stored in an ice bath. After 5 hours, 34.4% of the mixture of dienes had polymerized. The emulsion was transferred to a refrigerator at 10° C. and stored for an additional period of 43 hours. The emulsion, now completely polymerized, was stabilized as in the above examples and films prepared in the same manner. These rubber-like films had a tensile strength of 2100 lbs./in.$^2$ and better tear resistance than films from emulsions of chlorobutadiene alone but stiffened very rapidly.

Example XI

An emulsion was prepared which was similar in every way to that of Example X, except that 10 g. of bromo-2-butadiene-1,3 and 90 g. of chloro-2-butadiene-1,3 were used. The emulsion polymerized much more rapidly (51.25% in 5 hours) but the product was very similar.

B. *Non-rubber-like compositions prepared by polymerizing chloro-2-butadiene-1,3 in the presence of gums, resins, polymerizable and polymeric materials, etc.*

The rubber-like polymers of chloro-2-butadiene-1,3 are characterized by great toughness, extensibility and strength as well as by good resistance to the action of many solvents and reagents and to the destructive action of heat, light, oxygen and ozone. The process of the present invention extends the usefulness of chlorobutadiene polymers in the fields of coating compositions, impregnating agents, adhesives, molding compounds, etc., in which great extensibility is not required but in which some of the other properties of chlorobutadiene polymers such as toughness, inertness and long life are highly desirable.

As stated above, the process of this invention comprises the polymerization of chloro-2-butadiene-1,3 in the presence of added ingredients of most varied nature. In some cases actual chemical intercombination of molecules of monomeric or polymeric chlorobutadiene with the added ingredients probably occurs but this is not essential to the operation of the process. Whether or not such combination occurs is usually very difficult to determine. Nevertheless, the process leads to products which are in many respects superior to those which would be obtained by simple admixture, with or without a common solvent or dispersing medium, of separately formed chlorobutadiene polymer with the added ingredient. It has already been stated that by the present process we are often able readily to prepare compositions which are difficult or impossible to prepare by any other method because of unsuitable physical properties such as incompatibility (in film-forming compositions), lack of mutual solvents or lack of plasticity.

It has been stated that an object of this invention is to provide a means of imparting to the various gums, resins, etc., some of the desirable properties of the polymers of chlorobutadiene. It will be obvious that a further object is to confer on the chlorobutadiene polymer some of the properties of these added ingredients such as hardness, adhesiveness, brittleness, etc., and further that the properties of the products will be influenced greatly by the relative amounts of the ingredients. We are therefore not limited to the proportions set forth in the examples and the amount of chlorobutadiene in the unpolymerized mixture or of chlorobutadiene polymer in the polymerized composition may vary from 1%–99% of the total.

Example XII

A solution of 30 g. of chloro-2-butadiene-1,3, 20 g. of China-wood oil and 0.3 g. of benzoyl peroxide in 50 g. of xylene was heated in a sealed tube at 100° C. for 3.75 hours. A determination of non-volatile material showed that 43% of the chlorobutadiene had polymerized. When flowed out on glass or metal the product dried to a homogeneous, tack-free film. It adhered to such surfaces better than do films from solutions of polymers of pure chlorobutadiene. It did not have the high extensibility of the polymers of pure chlorobutadiene but retained the toughness and flexibility of the latter and was therefore better suited for use as an impregnating or coating composition.

It may be stated that a product similar to the one just described can not be obtained by admixing separately prepared chlorobutadiene polymer with China-wood oil. For example, when China-wood oil was added to a solution of chlorobutadiene polymer prepared by heating 100 parts of chlorobutadiene, 100 parts of xylene and 0.2 part of benzoyl peroxide at 100° C. for three hours, the resulting solution gave soft, hazy, tacky films on glass.

In the process of Example XII many other substances such as Menhaden oil, sardine oil, soya bean oil, linseed oil, Perilla oil, China-wood or linseed oil acids, etc. may be used instead of the China-wood oil and thereby products of similar properties may be obtained. Driers such as cobalt resinate may be added either before or after the polymerization if desired.

Example XIII

A solution of 35 g. of chloro-2-butadiene-1,3, 15 g. of rosin and 0.35 g. of benzoyl peroxide in 50 g. of xylene was heated in a sealed tube at 100° C. for 12 hours. Analysis of the resulting product indicated that it contained about 48% of polymerized chlorobutadiene and 52% of rosin. Films of this material dried tack-free in 24 hours and combined the hardness of rosin with the flexibility and toughness of chlorobutadiene polymers. A composition prepared by dissolving equal weights of rosin and plastic chlorobutadiene polymer in xylene requires a very much longer time to dry tack-free.

Chlorobutadiene may also be polymerized in the presence of both rosin and one or more of the oils disclosed in Example 12. Ester gum may also be used instead of rosin and thereby products harder than polymers of chlorobutadiene but more flexible and less brittle than ester gum are obtained. Other substances may be substituted for rosin in the process of Example XIII. As examples of other resins the following may be mentioned: Congo, Kauri, Manila, pine balsam, chlorinated naphthalene resins, chlorinated diphenyl resins and condensation products of p-toluenesulfonamide and formaldehyde. The term "gum" has been used, herein, interchangeably with the term "resin", to describe a number of substances commonly called gums but which are really natural resins, for example, gum Kauri, rosin, etc. It will be understood, therefore, that wherever the term "natural resin" is used in the claims, it is intended to include within its scope all of the naturally occurring materials identified herein, either by the term "gum" or by the term "resin."

*Example XIV*

A modified polyhydric alcohol-polybasic acid resin was prepared by heating 15.3 parts of glycerol, 27.3 parts of phthalic anhydride and 51.6 parts of rosin at 250° C. until the acid number was reduced to 15. Fifteen grams of this resin, 35 g. of chlorobutadiene and 0.35 g. of benzoyl peroxide were dissolved in 50 g. of xylene and heated at 100° C. for twelve hours. The product obtained consisted of approximately 66% of polymerized chlorobutadiene and 34% modified glyceryl phthalate resin. It dried to a tack-free film having good hardness, toughness and flexibility.

In a parallel experiment, five parts of the same polyhydric alcohol-polybasic acid resin were added to a xylene solution containing ten parts of a chlorobutadiene polymer prepared by heating 100 parts of chlorobutadiene, 100 parts of xylene and 0.2 part of benzoyl peroxide at 100° C. for three hours. This resin-chlorobutadiene polymer admixture gave soft, tacky, hazy films.

*Example XV*

A synthetic resin was prepared by heating 14.6 parts of glycerol, 20.7 parts of phthalic anhydride, 13.2 parts of rosin and 31.5 parts of China-wood oil acids at 250° C. until the acid number was reduced to 25. Twelve grams of this resin, 36 g. of chlorobutadiene and 0.36 g. of benzoyl peroxide were dissolved in 52 g. of xylene and the solution heated for 12 hours at 100° C. The product was found by analysis to consist of approximately 34% of modified glyceryl phthalate resin and 66% of polymerized chlorobutadiene. As in Example XIV, the product was a tough, clear resin having better flexibility than the original phthalate resin.

It should be noted that a xylene solution of the phthalate resin of this example and plastic chlorobutadiene polymer, in equal parts, dries to a heterogeneous film but that additional quantities of phthalate resin may be added to the interpolymer solution of Example XV and clear films obtained even when the phthalate resin is present in an amount twice that of the polymerized chlorobutadiene.

Further it is obvious that the process is not limited to the particular dibasic acid-polyhydric alcohol resins described in the preceding examples but that these may be prepared in any of the multiplicity of variations known to the art. For example, the polyhydric alcohol-polybasic acid resin may be prepared by reacting one or more polybasic acids, such as phthalic, succinic, adipic, sebacic, fumaric, citric, tricarballylic, phthalic, dilactylic, hexahydrophthalic, quinolinic, diphenic, and naphthalic, with one or more polyhydric alcohols, such as glycerol, ethylene glycol, butylene glycol, diethylene glycol, polyglycerols, pentaerythritol, glycerol monobenzyl ether, pentaerythritol diethyl ether, and dimethyldimethylolmethane, with or without one or more modifying agents, such as butyric acid, stearic acid, oleic acid, castor oil or oil acids, soya bean oil or oil acids, cottonseed oil or oil acids, coconut oil or oil acids, linseed oil or oil acids, China-wood oil or oil acids, benzoic acid, naphthionic acid, amyl alcohol, dodecyl alcohol, oleyl alcohol, benzyl alcohol, cyclohexyl alcohol, butoxyethyl alcohol, glycerol diethyl ether, etc. An especially advantageous type of polyhydric alcohol-polybasic acid resin for our purposes is that modified by drying oil acids; such a resin is obtainable for example from glycerol, phthalic anhydride, and linseed and/or China-wood oil acids.

*Example XVI*

A solution of 35 g. of chloro-2-butadiene-1,3 0.35 g. of benzoyl peroxide and 15 g. of a xylene-soluble phenol-aldehyde resin dissolved in 50 g. of xylene was heated at 100° C. for 7 hours. The resinous reaction product was shown by analysis to consist of about 40% of polymerized chlorobutadiene and 60% of phenol-formaldehyde resin. Films of this product were somewhat hazy but dried tack-free, were quite hard and tough and were more flexible than films from the original resin alone.

By replacing one-third of the resin in the process of Example XVI with ester gum, a very similar, flexible tough resin was obtained. This resin dried tack-free to clear films.

*Example XVII*

In the process of Example XVI, 15 g. of a rosin-modified phenol-formaldehyde resin were used instead of the resin described in the preceding example and heating was carried out for three hours at 100° C. The resinous reaction product contained approximately 59% of polymerized chlorobutadiene and 41% of resin. Films of this resin were tack-free and although not very hard they were tough, flexible and elastic.

*Example XVIII*

A solution of 29 g. of chloro-2-butadiene-1,3, 0.29 g. of benzoyl peroxide and 12 g. of one-half second nitrocellulose in 59 g. of butyl acetate was heated for three hours at 100° C. The product of the reaction was shown by analysis to contain about 33% of nitrocellulose and 67% of polymerized chlorobutadiene. Films of the product were tough and flexible and dried tack-free.

*Example XIX*

A solution consisting of 35 g. of chloro-2-butadiene-1,3, 0.35 g. of benzoyl peroxide, 7.5 g. of one-half second nitrocellulose and 7.5 g. of blown linseed oil dissolved in 50 g. of butyl acetate was heated at 100° C. for 3 hours. The reaction product consisted of approximately 66% of polymerized chlorobutadiene and 17% each of linseed oil and nitrocellulose. It gave tack-free films.

In the process of Examples XVIII and XIX other cellulose derivatives such as ethyl cellulose, butyl cellulose, dodecyl cellulose, benzyl cellulose, cellulose propionate, cellulose butyrate and cellulose aceto-propionate may be used instead of nitrocellulose and flexible and tack-free products obtained.

Example XX

A solution of 35 g. of chloro-2-butadiene-1,3, 0.35 g. of benzoyl peroxide and 15 g. of an artificial resin known as Resin No. 201 of the Thomas and Hochwalt laboratories, reputed to be prepared by polymerizing a mixture of olefines and diolefines by means of aluminum chloride, in 50 g. of xylene was heated for 3 hours at 100° C. The reaction product contained approximately 52% of polymerized chlorobutadiene and 48% of Resin 201. Films of this reaction product were clear and tack-free and had good flexibility, toughness and elasticity.

Example XXI

A solution of 35 g. of chlorobutadiene, 0.35 g. of benzoyl peroxide, 22 g. of styrene, and 4 g. of ethylbenzene in 39 g. of xylene was heated at 100° C. for 3.5 hours. The product of the reaction when freed from solvents and unpolymerized reactants, contained 33.2% of chlorine. This analysis indicated the presence of 83% of polymerized chlorobutadiene and 17% of polymerized styrene in the reaction product. Films from this product were clear and tack-free, flexible and somewhat elastic.

If, in the process of Example XXI, the styrene was replaced by its polymer, meta-styrene, opaque, waxy films were obtained.

Example XXII

A solution consisting of 35 g. of chloro-2-butadiene-1,3, 0.35 g. of benzoyl peroxide, 15 g. of coumarone resin and 50 g. of xylene was heated at 100° C. for 3 hours. The reaction product contained about 59% of polymerized chlorobutadiene and 41% of coumarone resin. Films from this product were flexible but did not dry tack-free.

Example XXIII

Fourteen grams of China-wood oil and 1 g. of sulfur chloride were mixed rapidly with a stirrer and 50 g. of xylene added as the China-wood oil began to thicken. To this solution was added 35 g. of chloro-2-butadiene-1,3 in which had been dissolved 0.35 g. of benzoyl peroxide and the solution heated at 100° C. for 3 hours. The reaction product was a soft, tack-free resin, flexible but not highly extensible.

Example XXIV

A resin solution was prepared by condensing p-hydroxydiphenyl and trioxymethlene in the presence of concentrated hydrochloric acid using xylene as the solvent. This resin and chlorobutadiene were then mixed to give a solution of the following composition (parts by weight):

| | Parts |
|---|---|
| p-hydroxydiphenyl-formaldehyde resin | 15 |
| Chloro-2-butadiene-1,3 | 35 |
| Xylene | 50 |
| Benzoyl peroxide | 0.35 |

This solution was heated at 100° C. for 3.25 hours. The resulting product was a clear resin which dried to a tack-free, brittle film. It contained about 32% of polymerized chlorobutadiene and 68% of the phenol-aldehyde resin.

Example XXV

A solution having the following composition was heated at 100° C. for 3 hours:

| | Grams |
|---|---|
| Chlorobutadiene | 35 |
| Blown Mexican Mid-Continent asphalt (m. p.=200° F.) | 15 |
| Xylene | 50 |
| Benzoyl peroxide | 0.35 |

The reaction product resembled the original asphalt but was considerably softer and more flexible. In the process of Example XXV, gilsonite and other asphaltic materials may also be used.

Example XXVI

One hundred grams of chloro-2-butadiene-1,3 were emulsified in a casein solution of the following composition:

| | Grams |
|---|---|
| Casein | 100 |
| Water | 625 |
| 29% ammonia | 22 |
| Sodium oleate | 2 |

The emulsion was kept at a temperature of 0°–10° C. over night and flow-outs gave hard, flexible, transparent films which had good adhesion to glass and paper.

Example XXVII

Seventy-five grams of chloro-2-butadiene-1,3 were emulsified in a solution of the following composition:

| | Grams |
|---|---|
| Casein | 25.0 |
| Borax | 4.5 |
| Water | 220.0 |
| Hexamethylenetetramine | 7.5 |
| 2% sodium oleate solution | 75.0 |

The emulsion was stored over night at 0°–10° C. Films from the emulsion were tough and flexible.

Example XXVIII

An emulsion of 20.3 g. of chloro-2-butadiene-1,3 in the following solution was stored over night at 0°–10° C.

| | Grams |
|---|---|
| Blood albumin | 20.3 |
| Water | 37.4 |
| 2% sodium oleate solution | 20.3 |
| Concentrated ammonia | 1.7 |

Films from this emulsion were fairly hard, clear and flexible and adhered well to glass or paper.

Example XXIX

Twenty grams of shellac were dissolved in 100 g. of water and 18 g. of 29% ammonia by warming on the water bath. The solution was cooled and 1.2 g. of sodium oleate added. After the soap had dissolved, 60 g. of chloro-2-butadiene-1,3 were emulsified in the shellac-soap solution. The emulsion was kept over night at 0°–10° C. The emulsion gave hard films which were considerably more flexible than shellac and which adhered well to metal, paper, cloth and other surfaces.

A less prefererd embodiment of this invention is that in which chlorobutadiene is caused to polymerize in the presence of the constituents of a synthetic resin under conditions which lead to resin formation from those constituents. The following example is an illustration:

Example XXX

A solution having the following composition was heated for 3 hours at 100° C.

|  | Grams |
|---|---|
| Chloro-2-butadiene 1,3 | 35 |
| Phenol | 7.5 |
| Benzaldehyde | 7.5 |
| Benzoyl peroxide | 0.35 |
| Xylene | 50.0 |

The reaction product was a resin containing approximately 44% of polymerized chlorobutadiene. Films from this resin were elastic and fairly tough and showed good adhesive properties.

In applying the products of this invention it is often desirable to admix them with pigments, dyes, antioxidants, or other modifying agents, and the use of such ingredients will be obvious to those skilled in the art relating to rubber, resins, gums, drying oils, etc.

The above description and examples are given by way of illustration only. Any variation therefrom which conforms to the spirit of the invention is intended to be included within the scope of the claims.

We claim:

1. The process which comprises polymerizing chloro-2-butadiene-1,3 in the presence of a film-forming material taken from the class consisting of natural resins, synthetic resins, cellulose derivatives and polymerizable materials having at least two carbon atoms in an open-chain joined by more than one bond.

2. The process which comprises polymerizing chloro-2-butadiene-1,3 in the presence of a solvent for the chloro-2-butadiene-1,3, said solvent being itself polymerizable.

3. The process which comprises polymerizing chloro-2-butadiene-1,3 in the presence of a resin.

4. The process which comprises polymerizing chloro-2-butadiene-1,3 in the presence of a polymerizable material having at least two carbon atoms in an open-chain joined by more than one bond.

5. The process of claim 2 characterized in that the process is carried out with the materials dispersed in an aqueous medium.

6. The process which comprises polymerizing chloro-2-butadiene-1,3 in the presence of a polyhydric alcohol-polycarboxylic acid condensation product.

7. The process which comprises polymerizing chloro-2-butadiene-1,3 in the presence of a drying oil.

8. The process of claim 1 characterized in that the polymerization takes place in the presence of a common solvent for the chloro-2-butadiene-1,3 and the film-forming material.

9. The process of claim 1 characterized in that the polymerization is carried out with the materials dispersed in an aqueous medium.

10. A product prepared by polymerizing chloro-2-butadiene-1,3 in the presence of a film-forming material taken from the class consisting of natural resins, synthetic resins, cellulose derivatives and polymerizable materials having at least two carbon atoms in an open-chain joined by more than one bond.

11. A product prepared by polymerizing chloro-2-butadiene-1,3 in the presence of a solvent for the chloro-2-butadiene-1,3, said solvent being itself polymerizable.

12. A product prepared by polymerizing chloro-2-butadiene-1,3 in the presence of a resin.

13. A product prepared by polymerizing chloro-2-butadiene 1,3 in the presence of a polymerizable material having at least two carbon atoms in an open-chain joined by more than one bond.

14. A product prepared by the process of claim 2 characterized in that the process is carried out with the materials dispersed in an aqueous medium.

15. A product prepared by polymerizing chloro-2-butadiene-1,3 in the presence of a polyhydric alcohol-polycarboxylic acid condensation product modified by a natural resin.

16. A product prepared by polymerizing chloro-2-butadiene-1,3 in the presence of a drying oil.

17. The product prepared by polymerizing chloro-2-butadiene-1,3 in the presence of as-dichloroethylene.

18. The product prepared by polymerizing chloro-2-butadiene-1,3 in the presence of a polycarboxylic acid-polyhydric alcohol condensation product.

19. The product prepared by polymerizing chloro-2-butadiene-1,3 in the presence of a polycarboxylic acid-polyhydric alcohol-drying oil acid condensation product.

20. A product prepared by polymerizing chloro-2-butadiene-1,3 in the presence of China-wood oil.

21. A solution produced by carrying out the process of claim 1 in the presence of a common solvent for the chloro-2-butadiene-1,3 and the film-forming material.

22. The process which comprises polymerizing a halogen-2-butadiene-1,3 in the presence of a film-forming substance taken from the class consisting of natural resins, synthetic resins, cellulose derivatives and polymerizable materials having at least two carbon atoms in an open-chain joined by more than one bond.

23. A product prepared by polymerizing a halogen-2-butadiene-1,3 in the presence of a film-forming substance taken from the class consisting of natural resins, synthetic resins, cellulose derivatives and polymerizable materials having at least two carbon atoms in an open-chain joined by more than one bond.

24. A product prepared by polymerizing chloro-2-butadiene-1,3 in the presence of a polyhydric alcohol-poly-carboxylic acid condensation product modified by a fatty oil.

25. A product prepared by polymerizing chloro-2-butadiene-1,3 in the presence of a polyhydric alcohol-polycarboxylic acid condensation product modified by a fatty acid.

WALLACE H. CAROTHERS.
ARNOLD M. COLLINS.
JAMES E. KIRBY.